United States Patent
Lobo et al.

(10) Patent No.: US 8,495,606 B2
(45) Date of Patent: Jul. 23, 2013

(54) REDUNDANT EXCEPTION HANDLING CODE REMOVAL

(75) Inventors: Sheldon M. Lobo, Cary, NC (US); Fu-Hwa Wang, Saratoga, CA (US)

(73) Assignee: Oracle America, Inc., Redwood City, CA (US)

(*) Notice: Subject to any disclaimer, the term of this patent is extended or adjusted under 35 U.S.C. 154(b) by 1008 days.

(21) Appl. No.: 12/271,451

(22) Filed: Nov. 14, 2008

(65) Prior Publication Data

US 2010/0125837 A1 May 20, 2010

(51) Int. Cl.
- *G06F 9/44* (2006.01)
- *G06F 9/45* (2006.01)
- *G06F 7/38* (2006.01)
- *G06F 13/00* (2006.01)
- *G06F 3/00* (2006.01)

(52) U.S. Cl.
USPC ........... 717/157; 717/132; 717/138; 717/151; 717/155; 717/160; 712/244; 719/318

(58) Field of Classification Search
None
See application file for complete search history.

(56) References Cited

U.S. PATENT DOCUMENTS

| | | | |
|---|---|---|---|
| 6,363,522 B1* | 3/2002 | Click et al. | 717/160 |
| 6,487,716 B1* | 11/2002 | Choi et al. | 717/159 |
| 6,738,976 B1* | 5/2004 | Meshenberg et al. | 719/318 |
| 7,120,904 B1* | 10/2006 | Robison | 717/155 |
| 7,213,242 B2* | 5/2007 | Robison | 717/151 |
| 7,937,695 B2* | 5/2011 | Stoodley | 717/160 |
| 2004/0019770 A1* | 1/2004 | Kawahito | 712/227 |
| 2004/0243982 A1* | 12/2004 | Robison | 717/132 |
| 2007/0074184 A1* | 3/2007 | Raghavan et al. | 717/138 |
| 2008/0320291 A1* | 12/2008 | Duffy et al. | 712/244 |
| 2009/0222803 A1* | 9/2009 | Bratanov | 717/155 |
| 2009/0271801 A1* | 10/2009 | Bratanov et al. | 718/108 |
| 2012/0167061 A1* | 6/2012 | Kirovski et al. | 717/132 |

OTHER PUBLICATIONS

Takeshi Ogasawara et al., A Study of Exception Handling and Its Dynamic Optimization in Java, ACM 2001, [Retrieved on Dec. 21, 2012]. Retrieved from the internet: <URL: http://dl.acm.org/citation.cfm?id=504289> 13 pages. (83-95).*

Jeff Bogda et al., Removing Unnecessary Synchronization in Java, ACM 1999, [Retrieved on Dec. 21, 2012]. Retrieved from the Internet: <URL: http://dl.acm.org/citation.cfm?id=320388> 112 pages. (35-46).*

* cited by examiner

*Primary Examiner* — Don Wong
*Assistant Examiner* — Anibal Rivera
(74) *Attorney, Agent, or Firm* — Polsinelli, PC (57) ABSTRACT

A system performs operations comprising creating a call graph for a program translated from source code, identifying redundant exception handling code in the program utilizing the call graph, and removing the redundant exception handling code. The operation of identifying redundant exception handling code may comprise identifying at least one function or callsite by determining that a first function in the at least one function's or callsite's callee chain throws an exception and that the exception is handled by a second function in the function's or callsite's callee chain or by determining that an exception is not thrown in the at least one function's or callsite's callee chain. The operation of removing the redundant exception handling code may comprise removing redundant exception handling code included in at least one function or callsite and/or removing at least one entry for the at least one function or callsite from an exception lookup table.

13 Claims, 8 Drawing Sheets

REDUNDANT EXCEPTION HANDLING CODE REMOVAL

FIELD OF THE INVENTION

This invention relates generally to computing devices, and more specifically to methods and systems for redundant exception handling code removal.

BACKGROUND

Software exception handling is a programming language construct designed to handle the occurrence of some exceptional condition that changes the normal flow of execution. Exceptional conditions may include, but are not limited to, an attempt to divide by zero and/or an attempt to access a non-existent file. When the occurrence of an exception is signaled, the stack of function calls is unwound until the appropriate exception handler is found. Programming language interpreters and compilers that support exception handling typically insert code to handle the stack unwind in case of the occurrence of an exception when translating source code into one or more various types of intermediate representations.

For example, in the C++ programming language an exception is triggered by the "throw" keyword. The scope of exception handlers in the C++ programming language are delineated with the keywords "try" (marking the beginning of the scope of an exception handler) and "catch" (marking the end of the scope of an exception handler). In C++, during a stack unwind the lifetime of local objects in an unwound function ends. C++ guarantees that the destructor for each of these local objects will be called during a stack unwind due to the occurrence of an exception. Thus, the code inserted by the C++ compiler to handle a stack unwind in case of the occurrence of an exception will include calling the destructors for all local objects in the function to be unwound.

SUMMARY

In an embodiment, a system for redundant exception handling code removal may include a computing device which may include at least one processing unit and at least one memory operatively coupled to the at least one processing unit. The computing device may also optionally include at least one storage medium operatively coupled to the at least one processing unit. The system may perform a method for redundant exception handling code removal. The method may comprise a computer-implemented method. The computer-implemented method may be performed by the system executing one or more sets of instructions included in a computer program product stored in a machine-readable medium. The computer program product may include, but is not limited to, one or more of a compiler, an interpreter, a linker, and an optimizer. The method may optimize compiled object files at link time by removing redundant exception handling code. The method may comprise the operation of creating a call graph for a program that has been translated from source code, the operation of analyzing the call graph to identify redundant exception handling code in the program, and the operation of removing the redundant exception handling code from the program. The method may also include the optional operation of concatenating the program into a binary file after the redundant exception handling code has been removed and/or storing the program to a machine readable medium after the redundant exception handling code has been removed.

The operation of analyzing the call graph to identify redundant exception handling code in the program may include utilizing the call graph to identify at least one function or callsite which includes at least a portion of the redundant exception handling code by determining that an exception is not thrown in the at least one function's or callsite's callee chain. Utilizing the call graph to identify at least one function or callsite which includes at least a portion of the redundant exception handling code by determining that an exception is not thrown in the at least one function's or callsite's chain may comprise marking a function in the call graph if the function throws at least one exception and determining that the at least one function's or callsite's callee chain does not include a marked function.

Alternatively, the operation of analyzing the call graph to identify redundant exception handling code in the program may include utilizing the call graph to identify at least one function or callsite which includes at least a portion of the redundant exception handling code by determining that a first function in the at least one function's or callsite's callee chain throws an exception and that the exception is handled by a second function in the function's or callsite's callee chain.

Alternatively, the operation of analyzing the call graph to identify redundant exception handling code in the program may comprise utilizing the call graph to identify at least one function or callsite which includes at least a portion of the redundant exception handling code by determining that a first function in the at least one function's or callsite's callee chain throws an exception and that the exception is handled by a second function in the function's or callsite's callee chain or by determining that an exception is not thrown in the at least one function's or callsite's callee chain.

The operation of removing the redundant exception handling code from the program may comprise removing redundant exception handling code included in at least one function or callsite. The operation of removing the redundant exception handling code from the program may comprise removing at least one entry for the at least one function or callsite from an exception lookup table.

The at least one processing unit may concatenate the program into a binary file after the redundant exception handling code has been removed. The at least one processing unit may store the program to the at least one storage medium after the redundant exception handling code has been removed. The at least one processing unit may also concatenate the program into a binary file after the redundant exception handling code has been removed and then store the binary file to the at least one storage medium.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The present disclosure may be better understood, and its numerous features made apparent to those skilled in the art by referencing the accompanying drawings.

DETAILED DESCRIPTION OF THE EMBODIMENTS

When an interpreter and/or compiler that supports exception handling translates source code into one or more various types of intermediate representations the interpreter and/or compiler typically is unaware whether a particular call in a function is capable of throwing an exception. As a result, the interpreter and/or compiler will typically insert code to handle a stack unwind in case of the occurrence of an exception. However, an exception may not be able to occur from a particular function. For example, in C++ the "throw" keyword may not be present in any subsequent callee function related to the particular function. The code inserted into the particular function for handling a stack unwind is therefore redundant and may be deleted.

The presence of redundant code in a program may cause a variety of problems. A program including redundant code may be larger than the same program without the redundant code. Large programs may require more storage space than smaller programs. The presence of redundant code in a program may therefore cause the program to require a larger space for storage. Further, the presence of redundant code in a program may cause runtime performance issues. Larger programs may result in increased paging and cache (such as instruction cache) miss penalties. Therefore, larger program size due to redundant code may result in poorer runtime performance.

In addition to larger program size due to the presence of redundant code in a program, functions which may throw exceptions may be included in an exception lookup table for the program. When an exception is thrown, a lookup of this exception lookup table may be performed to find the related exception handling code for the function call that threw the exception. Redundant entries in the exception lookup table, entries for functions are not capable of throwing exceptions, may result in a larger exception lookup table than if the redundant entries were not included in the exception lookup table. A larger exception lookup table may cause the program to be larger than a smaller exception lookup table and may cause the same storage and runtime performance issues as the presence of redundant code in the program. Further, the exception lookup table is typically loaded into memory during runtime and an unnecessarily large exception lookup table may result in runtime performance issues such as page and cache misses. Moreover, performing a lookup on a larger exception lookup table may require more time than performing a lookup on a smaller exception lookup table. Therefore, redundant entries in an exception lookup table may result in poorer runtime performance due to longer lookup times. For example, lookups in an exception lookup table are typically performed as binary searches. In a binary search the search time may be proportional to the number of items to be searched and thus the more items to be searched the more time may be required to perform the search.

Some interpreters and/or compilers may include features allowing programmers to specify that a program does not throw exceptions. For interpreters and/or compilers that offer this feature, the interpreter and/or compiler will typically not insert stack unwind code to handle exceptions. For example, in the Sun Studio™ C++ compiler this feature is invoked by utilizing the "-noex" option and in the GCC™ C++ compiler this feature is invoked by utilizing the "-fnoexceptions" option. However, this approach requires the programmer to specify that the program does not throw exceptions. Further, this approach may only be utilized on the module or entire application level. If even one function within a module or program this approach cannot be utilized even if that function is the only function that throws an exception.

Some interpreters and/or compilers may include features allowing programmers to specify that a function does not throw exceptions. For interpreters and/or compilers that offer this feature, the interpreter and/or compiler will typically not insert stack unwind code to handle exceptions. For example, the C++ standard allows the user to specify the keyword "throw( )" in a function declaration to notify the C++ compiler that a function does not throw exceptions. However, this approach is cumbersome as it must be specified for each function that does not throw an exception, which typically may be the majority. Further, this approach places the burden on the programmer to ensure that all callees of a function do not throw exceptions.

Figure 1:
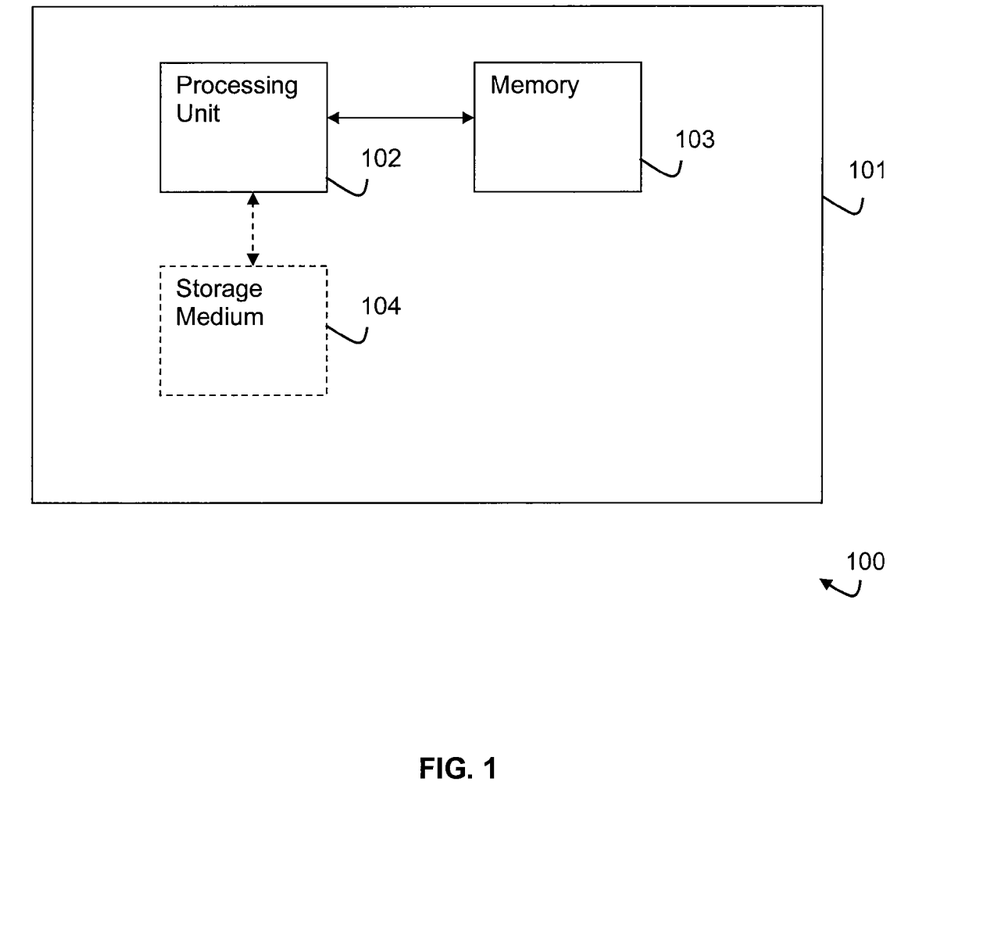
FIG. 1 is a block diagram illustrating a system 100 for redundant exception handling code removal, in accordance with an embodiment of the present disclosure.

FIG. 1 illustrates a system 100 for redundant exception handling code removal, in accordance with an embodiment of the present disclosure. The system 100 may include a computing device 101 which may include at least one processing unit 102 and at least one memory 103 operatively coupled to the at least one processing unit 102. The computing device 101 may also optionally include at least one storage medium 104 operatively coupled to the at least one processing unit 102. The at least one storage medium 104 may include, but are not limited to, magnetic storage mediums (e.g., floppy diskette), optical storage mediums (e.g., CD-ROM); magneto-optical storage mediums, read only memory (ROM); random access memory (RAM); erasable programmable memory (e.g., EPROM and EEPROM); flash memory; or other types of mediums suitable for storing electronic information.

Figure 2:
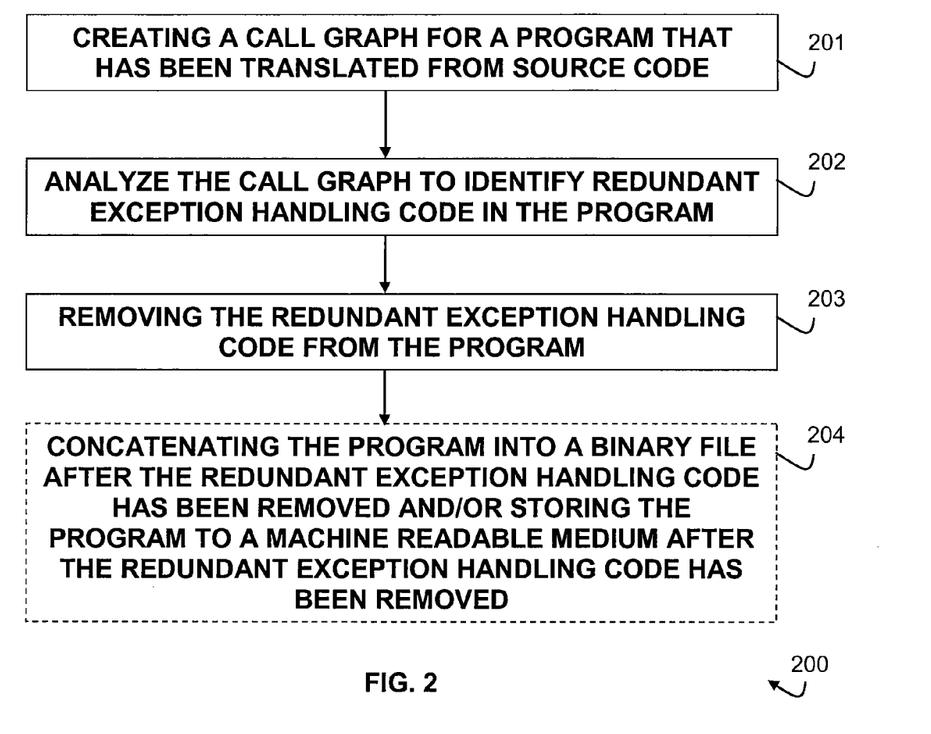
FIG. 2 method diagram illustrating a method 200 for redundant exception handling code removal, which may be performed by the system 100 of FIG. 1, in accordance with an embodiment of the present disclosure.

FIG. 2 illustrates a method 200 for redundant exception handling code removal, which may be performed by the system 100, in accordance with an embodiment of the present disclosure. The method 200 may comprise a computer-implemented method. The computer-implemented method may be performed by a processing unit, such as processing unit 102, executing one or more sets of instructions included in a computer program product stored in a machine-readable medium, such as memory 103 or storage medium 104. The computer program product may include, but is not limited to, one or more of a compiler, an interpreter, a linker, and an optimizer. The method 200 may optimize compiled object files at link time by removing redundant exception handling code.

In a first operation 201, create a call graph for a program that has been translated from source code. In a second operation 202, analyze the call graph to identify redundant exception handling code in the program. In a third operation 203, remove the redundant exception handling code from the program. In some embodiments, the method 200 may include a fourth operation 204. In operation 204, concatenate the program into a binary file after the redundant exception handling code has been removed and/or store the program to a machine readable medium after the redundant exception handling code has been removed.

With respect to operation 201, the at least one processing unit 102 may create a call graph for a program stored in the at least one memory 103 and/or the at least one storage medium 104. Caller/callee relationships among one or more functions in the program may be described in the call graph. The at least one processing unit 102 may translate the program from source code utilizing one or more interpreters and/or compilers. The at least one processing unit 102 may translate source code stored in the at least one memory 103 and/or the at least one storage medium 104 and may store the translated source code in the at least one memory 103 and/or the at least one storage medium 104. Translating the program from source code may include compiling the source code and/or translating the source code into one or more intermediate representations of the source code. Source code may comprise one or more of .NET™ source code, Actionscript source code, Ada source code, C++ source code, D source code, ECMAscript™ source code, Eiffel source code, Java™ source code, Ocaml™ source code, PHP™ source code, ML source code, Object Pascal source code, Delphi source code, FreePascal source code, Objective-C source code, PL/1 (programming language one) source code, Smalltalk source code, Python™ source code, Ruby™ source code, REALbasic™ source code, and/or Prolog source code.

The operation 202 of analyzing the call graph to identify redundant exception handling code in the program may involve utilizing the call graph to identify at least one function which includes at least a portion of the redundant exception handling code. Identification of a function with some redundant exception handling code may involve determining that an exception is not thrown in the at least one function's callee chain. A function's callee chain may include any function called by the function or any function in the callee chain of any function called by the function. To identify at least one function which includes at least a portion of the redundant exception handling code by determining that an exception is not thrown in the at least one function's callee chain, mark a function in the call graph if the function throws at least one exception. Then, determine that the at least one function's callee chain does not include a marked function.

Alternatively, the operation 202 of analyzing the call graph to identify redundant exception handling code in the program may involve utilizing the call graph to identify at least one callsite which includes at least a portion of the redundant exception handling code by determining that an exception is not thrown in the at least one callsite's callee chain. A callsite may comprise the portion of a function that calls another function. The at least one callsite's callee chain may comprise any function called by the at least one callsite or any function in the callee chain of any function called by the at least one callsite. To identify at least one callsite which includes at least a portion of the redundant exception handling code by determining that an exception is not thrown in the at least one callsite's callee chain, mark a function in the call graph if the function throws at least one exception. Then, determine that the at least one callsite's callee chain does not include a marked function.

In yet another alternative, the operation 202 of analyzing the call graph to identify redundant exception handling code in the program may involve utilizing the call graph to identify at least one function which includes at least a portion of the redundant exception handling code by determining that a first function in the at least one function's callee chain throws an exception and that the exception is handled by a second function in the function's callee chain.

Alternatively, the operation 202 of analyzing the call graph to identify redundant exception handling code in the program may involve utilizing the call graph to identify at least one callsite which includes at least a portion of the redundant exception handling code by determining that a first function in the at least one callsite's callee chain throws an exception and that the exception is handled by a second function in the callsite's callee chain.

In still another alternative, the operation 202 of analyzing the call graph to identify redundant exception handling code in the program may involve utilizing the call graph to identify at least one function which includes at least a portion of the redundant exception handling code by determining that a first function in the at least one function's callee chain throws an exception and that the exception is handled by a second function in the function's callee chain or by determining that an exception is not thrown in the at least one function's callee chain.

Alternatively, the operation 202 of analyzing the call graph to identify redundant exception handling code in the program may involve utilizing the call graph to identify at least one callsite which includes at least a portion of the redundant exception handling code by determining that a first function in the at least one callsite's callee chain throws an exception and that the exception is handled by a second function in the callsite's callee chain or by determining that an exception is not thrown in the at least one callsite's callee chain.

The operation 203 of removing the redundant exception handling code from the program may comprise removing redundant exception handling code included in at least one function. The operation 203 of removing the redundant exception handling code from the program may comprise removing at least one entry for the at least one function from an exception lookup table. Removing the at least one entry for the at least one function from the exception lookup table may comprise deleting the entry and compressing the exception lookup table such that the memory footprint (the amount of memory required to contain the exception lookup table) of the exception table is reduced by the size of the at least one entry. The operation 203 of removing the redundant exception handling code from the program may comprise removing redundant exception handling code included in at least one callsite. The operation 203 of removing the redundant exception handling code from the program may comprise removing at least one entry for the at least one callsite from an exception lookup table. Removing the at least one entry for the at least one callsite from the exception lookup table may comprise deleting the entry and compressing the exception lookup table such that the memory footprint (the amount of memory required to contain the exception lookup table) of the exception table is reduced by the size of the at least one entry.

The at least one processing unit 102 may concatenate the program into a binary file after the redundant exception handling code has been removed. The at least one processing unit 102 may store the program to the at least one storage medium 104 after the redundant exception handling code has been removed. The at least one processing unit 102 may also concatenate the program into a binary file after the redundant exception handling code has been removed and then store the binary file to the at least one storage medium 104.

Figure 3A:
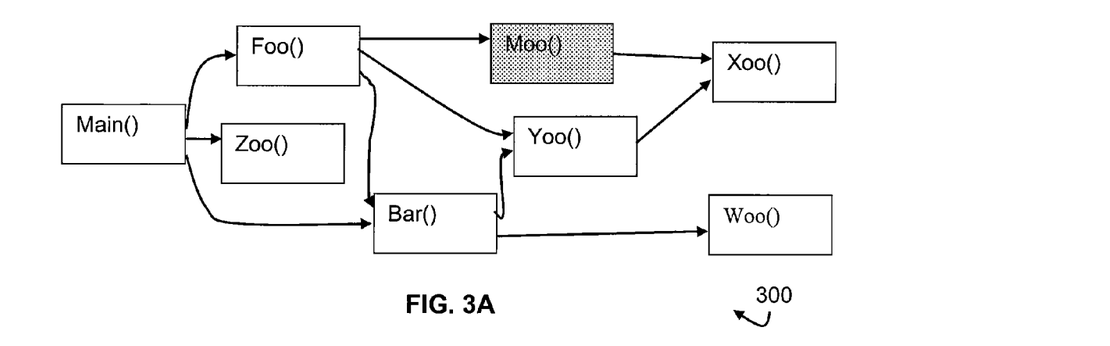
FIG. 3A is a diagram illustrating a call graph for a program.

By way of example of method 200, FIG. 3A illustrates a call graph 300 of a program. The call graph 300 illustrates that function Main( ) calls functions Foo( ), Zoo( ), and Bar( ). Function Foo( ) calls functions Moo( ), Yoo( ) and Bar( ). Function Bar( ) calls functions Yoo( ) and Woo( ). Function Moo( ) calls function Xoo( ). Function Yoo( ) calls function Xoo( ). Functions Main( ), Foo( ), Bar( ), Moo( ), and Yoo( ) may include stack unwind code in the event that an exception is thrown by a function in their callee chain. Functions Zoo( ), Xoo( ), and Woo( ) may not include stack unwind code as functions Zoo( ), Xoo( ), and Woo( ) do not call another function. Function Moo( ) is shaded to illustrate that function Moo( ) is capable of throwing an exception (i.e. includes machine code such as a call to _Crun::ex_throw( ) (in the Sun Studio™ compiler) or to _cxa_throw( ) (in the GCC™ compiler)) whereas functions Main( ), Foo( ), Zoo( ), Bar( ), Yoo( ), Xoo( ), and Woo( ) are not shaded to illustrate that they are not capable of throwing an exception.

Figure 3B:
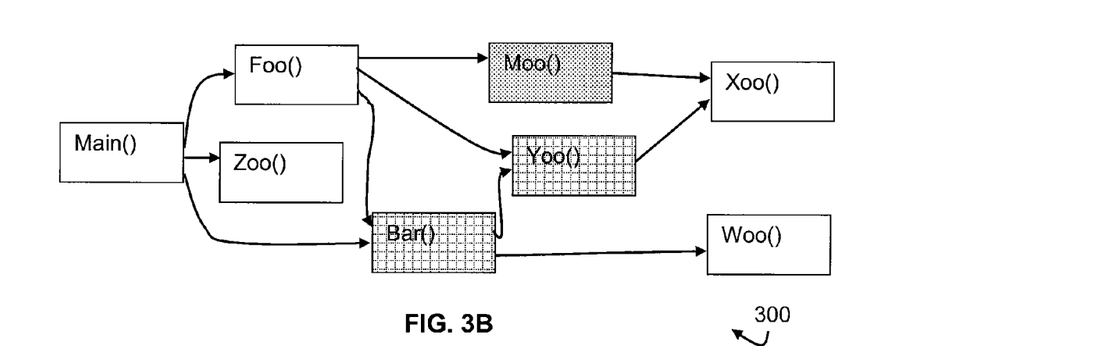
FIG. 3B is a diagram illustrating a call graph representing the removal of redundant code from the program represented by the call graph of FIG. 3A.

The stack unwind code included in functions Main( ) and Foo( ) is not redundant as a function in their callee chain, Moo( ), is capable of throwing an exception. The stack unwind code in functions Bar( ) and Yoo( ) is redundant as no function in their callee chain is capable of throwing an exception. Therefore, the stack unwind code in functions Bar( ) and Yoo( ) may be removed, as illustrated by the shading of functions Bar( ) and Yoo( ) in FIG. 3B.

Figure 3C:
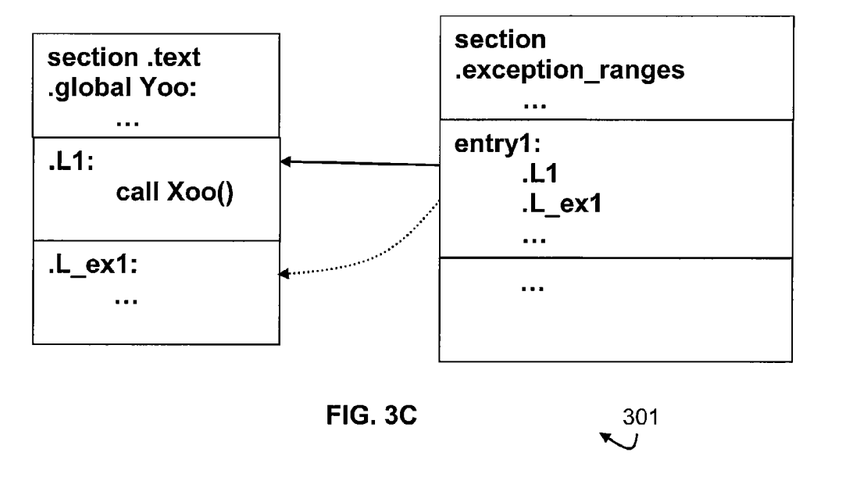
FIG. 3C is a diagram illustrating an exception lookup table for the program represented by the call graph of FIG. 3A.
Figure 3D:
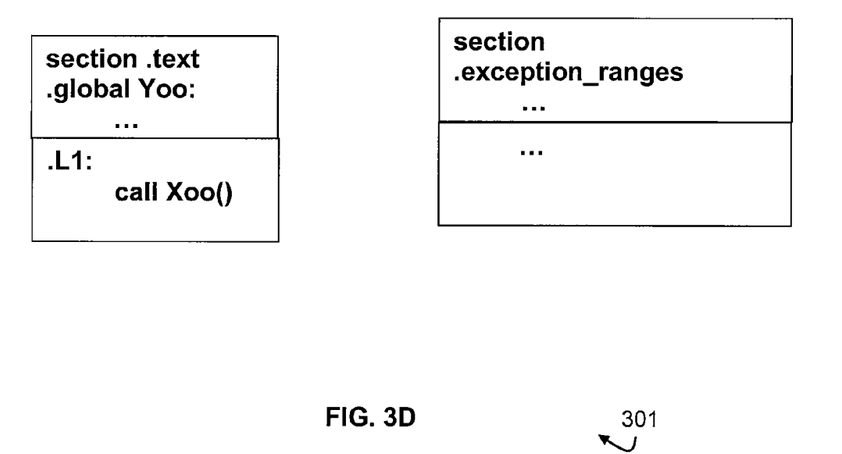
FIG. 3D is a diagram illustrating the removal of redundant entries from the exception lookup table of FIG. 3C and the removal of redundant code from the program.

FIG. 3C illustrates code for function Yoo( ) and corresponding sections of the exception lookup table of the program for function Yoo( ). As is illustrated, function Yoo( ) includes code L1 to call function Xoo( ) and stack unwind code L_ex1 for the function call to function Xoo( ). The exception lookup table includes entry1 which references code L1 and stack unwind code L_ex1, specifying that if function Xoo( ) throws an exception the stack unwind code for L1 is located at L_ex1. However, as stated above, function Xoo( ) is not capable of throwing an exception and the stack unwind code for function Yoo( ) is redundant and can be deleted. FIG. 3D illustrates the stack unwind code deleted from the code for function Yoo( ) and entry1 deleted from the exception lookup table. Thus, the size of the program and the exception lookup table has been reduced.

Figure 3E:
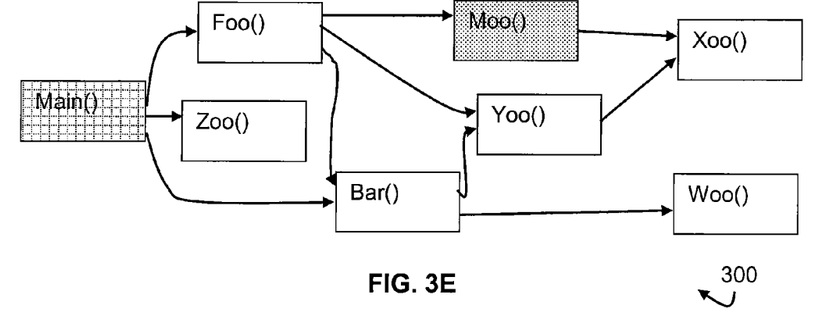
FIG. 3E is a diagram illustrating a call graph representing the removal of redundant code from the program represented by the call graph of FIG. 3A.

By way of an alternative example utilizing the call graph 300 for the program, function Moo( ) may throw an exception, but that exception may be handled by function Foo( ). Therefore, the stack unwind code in function Main( ) may be redundant even though a function in function Main( )'s callee chain throws an exception. As the stack unwind code in function Main( ) is redundant, it may be deleted as is illustrated by the shading of function Main( ) in FIG. 3E. In this example, the entry in the exception lookup table for function Main( ) may also be deleted as redundant.

Figure 3F:
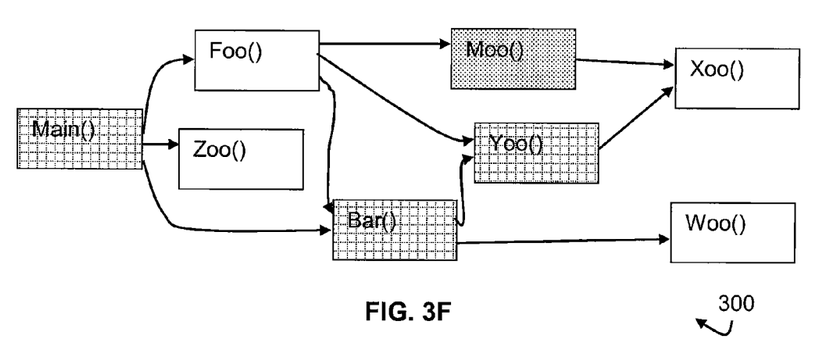
FIG. 3F is a diagram illustrating a call graph representing the removal of redundant code from the program represented by the call graph of FIG. 3A.

By way of still another example utilizing the call graph 300 for the program, the stack unwind code in functions Yoo( ), Bar( ), and Main( ) may all be redundant as functions Yoo( ) and Bar( ) do not have a function in their callee chain which is capable of throwing an exception and function Main( ) has a function in its callee chain which is capable of throwing an exception (function Moo( )), but that exception is handled by another function in its callee chain (function Foo( )). As the stack unwind code in functions Main( ), Bar( ), and Yoo( ) is redundant, it may be deleted as illustrated by the shading of functions Main( ), Bar( ), and Yoo( ) in FIG. 3F. The exception table lookup entries for functions Main( ), Bar( ), and Yoo( ) may also be deleted as redundant.

Figure 4A:
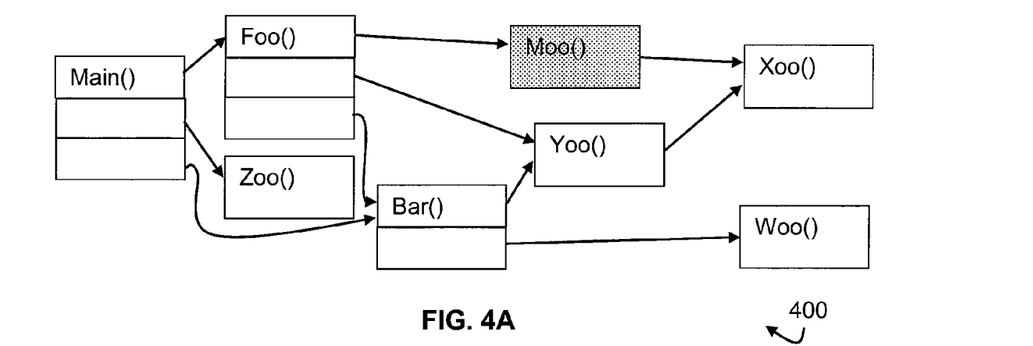
FIG. 4A is a diagram illustrating a fine-grained call graph for a program with call edges originating from specific call sites.
Figure 4B:
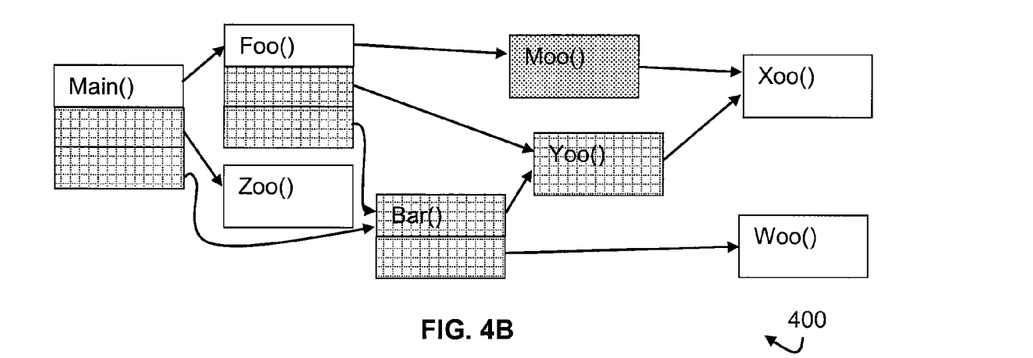
FIG. 4B is a diagram illustrating a call graph representing the removal of redundant code from the program represented by the call graph of FIG. 4A.

By way of another example, FIG. 4A illustrates a fine-grained call graph 400 for a program with call edges originating from specific call sites. The call graph 400 illustrates that function Main( ) includes three callsites. The first callsite of function Main( ) calls function Foo( ). The second callsite of function Main( ) calls function Zoo( ). The third callsite of function Main( ) calls function Bar( ). Function Foo( ) includes three callsites. The first callsite of function Foo( ) calls function Moo( ). The second callsite of function Foo( ) calls function Yoo( ). The third callsite of function Foo( ) calls function Bar( ). Function Bar( ) includes two callsites. The first callsite of function Bar( ) calls function Yoo( ). The second callsite of function Bar( ) calls function Woo( ). Function Moo( ) includes one callsite that calls function Xoo( ). Function Yoo( ) includes one callsite that calls function Xoo( ). Functions Zoo( ), Xoo( ), and Woo( ) do not include callsites as they do not call any functions. The callsites of functions Main( ), Foo( ), Bar( ), Moo( ), and Yoo( ) may include stack unwind code in the event that an occurrence is thrown by a function in their callee chain. Functions Zoo( ), Xoo( ), and Woo( ) may not include stack unwind code as functions Zoo( ), Xoo( ), and Woo( ) do not call another function. Function Moo( ) is shaded to illustrate that function Moo( ) is capable of throwing an exception whereas functions Main( ), Foo( ), Zoo( ), Bar( ), Yoo( ), Xoo( ), and Woo( ) are not shaded to illustrate that they are not capable of throwing an exception.

The stack unwind code included in the first callsite of function Main( ) and the first callsite of function Foo( ) is not redundant as a function in their callee chain, Moo( ), is capable of throwing an exception. The stack unwind code in the second and third callsites of function Main( ), the second and third callsites of function Foo( ), the first and second callsites of function Bar( ), and the callsite of function Yoo( ) is redundant as no function in their callee chain is capable of throwing an exception. Therefore, the stack unwind code in the second and third callsites of function Main( ), the second and third callsites of function Foo( ), the first and second callsites of function Bar( ), and the callsite of function Yoo( ) may be removed, as illustrated by the shading of the second and third callsites of function Main( ), the second and third callsites of function Foo( ), the first and second callsites of function Bar( ), and the callsite of function Yoo( ) in FIG. 3B.

Figure 4C:
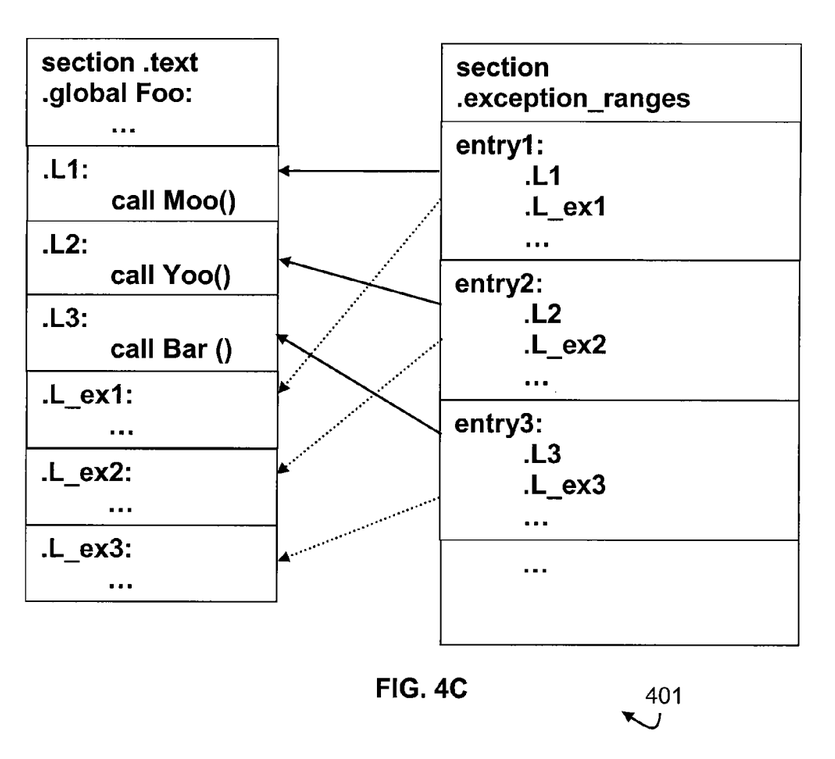
FIG. 4C is a diagram illustrating an exception lookup table for the program represented by the call graph of FIG. 4A.
Figure 4D:
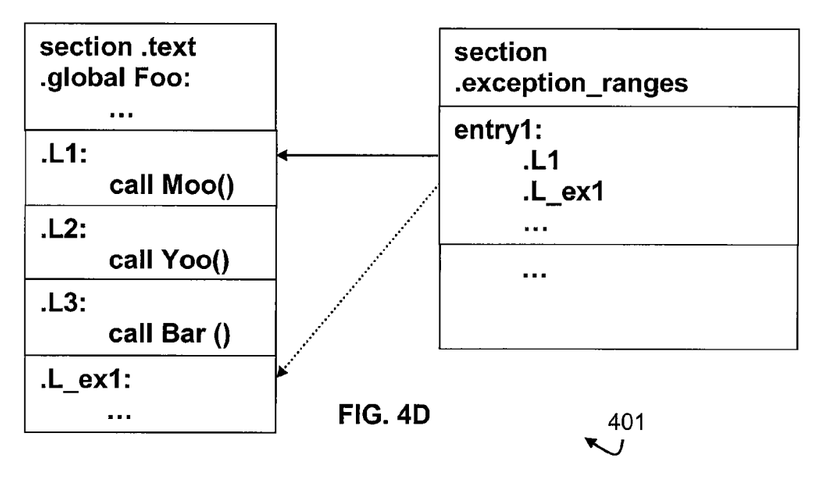
FIG. 4D is a diagram illustrating the removal of redundant entries from the exception lookup table of FIG. 4C and the removal of redundant code from the program.
Figure 4E:
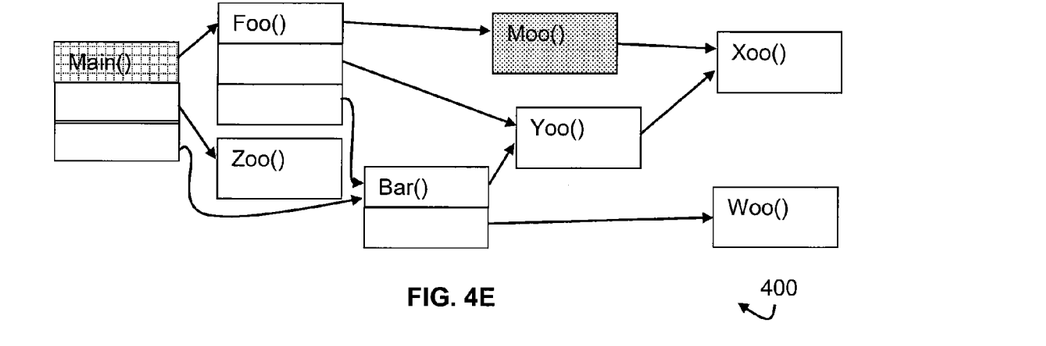
FIG. 4E is a diagram illustrating a call graph representing the removal of redundant code from the program represented by the call graph of FIG. 4A.
Figure 4F:
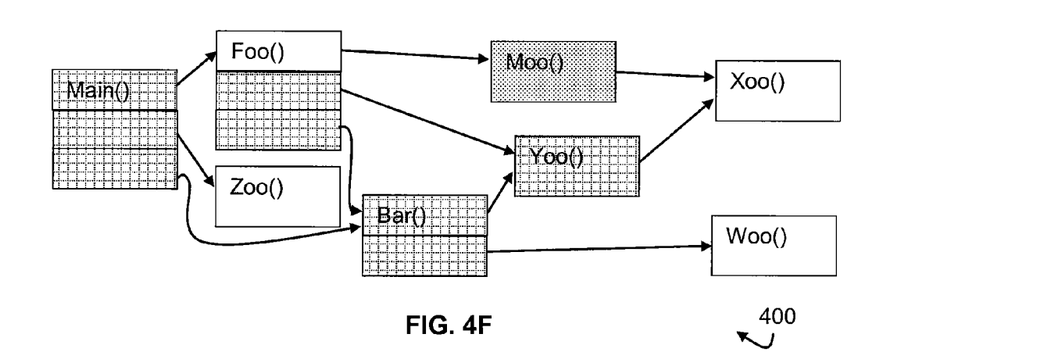
FIG. 4F is a diagram illustrating a call graph representing the removal of redundant code from the program represented by the call graph of FIG. 4A.

FIG. 4C illustrates code for function Foo( ) and corresponding sections of the exception lookup table of the program for function Yoo( ). As is illustrated, function Foo( ) includes code L1 for the first callsite to call function Moo( ), stack unwind code L_ex1 for the first callsite including the function call to function Moo( ), code L2 for the second callsite to call function Yoo( ), stack unwind code L_ex2 for the second callsite including the function call to function Yoo( ), code L3 for the third callsite to call function Bar( ), and stack unwind code L_ex3 for the third callsite including the function call to function Bar( ). The exception lookup table includes entry1 (which specifies that if function Moo( ) throws an exception the stack unwind code for L1 is located at L_ex1), entry2 (which specifies that if function Yoo( )

throws an exception the stack unwind code for L2 is located at L_ex2), and entry3 (which specifies that if function Bar( ) throws an exception the stack unwind code for L3 is located at L_ex3). However, as stated above, functions Yoo( ) and functions Bar( ) are not capable of throwing an exception and the stack unwind code (L_ex2 and L_ex3, respectively) for the second and third callsites (L2 and L3, respectively) are redundant and can be deleted. FIG. 4D illustrates the stack unwind code deleted from the code for function Foo( ) for callsites L2 and L3 and entry2 and entry3 deleted from the exception lookup table. Thus, the size of the program and the exception lookup table has been reduced.

By way of an alternative example utilizing the call graph 400 for the program, function Moo( ) may throw an exception, but that exception may be handled by function Foo( ). Therefore, the stack unwind code in the first callsite of function Main( ) may be redundant even though a function in the first callsite's callee chain throws an exception. As the stack unwind code in the first callsite of function Main( ) is redundant, it may be deleted as is illustrated by the shading of the first callsite of function Main( ) in FIG. 3E. In this example, the entry in the exception lookup table for the first callsite of function Main( ) may also be deleted as redundant.

By way of still another example utilizing the call graph 400 for the program, the stack unwind code in the callsite of function Yoo( ), the first and second callsites of function Bar( ), and all three callsites of function Main( ) may all be redundant as the callsite of function Yoo( ), the first and second callsites of function Bar( ), and the second and third callsites of function Main( ) do not have a function in their callee chain which is capable of throwing an exception and the first callsite of function Main( ) has a function in its callee chain which is capable of throwing an exception (function Moo( )), but that exception is handled by another function in its callee chain (function Foo( )). As the stack unwind code in the callsite of function Yoo( ), the first and second callsites of function Bar( ), and all three callsites of function Main( ) is redundant, it may be deleted as illustrated by the shading of the callsite of function Yoo( ), the first and second callsites of function Bar( ), and all three callsites of function Main( ) in FIG. 3F. The exception table lookup entries for the callsite of function Yoo( ), the first and second callsites of function Bar( ), and all three callsites of function Main( ) may also be deleted as redundant.

The present disclosure allows for the identification and removal of redundant code in programs. Compiled object files for the program may be optimized at link time by removing redundant exception handling code. The identification and removal of redundant code in a program may allow the optimized program to be a smaller size than an unoptimized version of the program including the redundant code. As such, the optimized program may occupy less space in cache, memory, and/or various storage media. Additionally, the optimized program may have improved runtime performance over an unoptimized version of the program due to improved paging, caching, and exception table lookup.

The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A computer-implemented method, comprising:
    creating a call graph for a program that has been translated from source code;
    marking a function in the call graph if the function throws at least one exception;
    analyzing the call graph to identify redundant exception handling code in the program by:
    identifying at least one function which includes at least a portion of the redundant exception handling code by determining that an exception is not thrown in a callee chain corresponding to the at least one function by determining that the callee chain does not include a marked function; and
    removing the redundant exception handling code from the program.

2. The computer-implemented method of claim 1, wherein said removing the redundant exception handling code from the program comprises:
    removing the portion of the redundant exception handling code included in the at least one function.

3. The computer-implemented method of claim 2, wherein said removing the redundant exception handling code from the program further comprises:
    removing at least one entry for the at least one function from an exception lookup table.

4. The computer-implemented method of claim 1, wherein said program is interpreted from the source code.

5. The computer-implemented method of claim 1, wherein said program is interpreting from the source code.

6. The computer-implemented method of claim 1, wherein said source code comprises at least one of actionscript source code, ada source code, c++ source code, d source code, eiffel source code, ml source code, object pascal source code, delphi source code, freepascal source code, objective-c source code, pl/1 (programming language one) source code, smalltalk source code, and prolog source code.

7. The computer-implemented method of claim 1, further comprising:
concatenating the program into a binary file after the redundant exception handling code has been removed.

8. The computer-implemented method of claim 1, further comprising:
storing the program to a machine readable medium after the redundant exception handling code has been removed.

9. A system, comprising:
a memory which stores a program that has been translated from source code; and
a processing unit, operatively coupled to the memory, wherein the processing unit creates a call graph for the program, marks a function in the call graph if the function throws at least one exception, analyzes the call graph to identify redundant exception handling code in the program by identifying at least one function which includes at least a portion of the redundant exception handling code by determining that an exception is not thrown in a callee chain corresponding to the at least one function by determining that the callee chain does not include a marked function, and removes the redundant exception handling code from the program.

10. A non-transitory computer program product, including a computer readable storage medium and instructions executable by a processing unit tangibly embodied in the computer readable storage medium, the instructions comprising:
a first set of instructions for creating a call graph for a program that has been translated from source code;
a second set of instructions for marking a function in the call graph if the function throws at least one exception;
a third set of instructions for analyzing the call graph to identify redundant exception handling code in the program by:
identifying at least one function which includes at least a portion of the redundant exception handling code by determining that an exception is not thrown in a callee chain corresponding to the at least one function by determining that the callee chain does not include a marked function; and a fourth third set of instructions for removing the redundant exception handling code from the program.

11. A computer-implemented method, comprising:
creating a call graph for a program that has been translated from source code;
marking a function in the call graph if the function throws at least one exception;
analyzing the call graph to identify redundant exception handling code in the program by:
identifying at least one function which includes at least a portion of the redundant exception handling code by determining that an exception is not thrown in at least one callsite corresponding to the at least one function by determining that the at least one callsite does not include a marked function; and
removing the redundant exception handling code from the program.

12. A computer-implemented method, comprising:
creating a call graph for a program that has been translated from source code;
marking a function in the call graph if the function throws at least one exception;
analyzing the call graph to identify redundant exception handling code in the program by:
identifying at least one function which includes at least a portion of the redundant exception handling code by determining that a first function in a callee chain corresponding to the at least one function throws an exception and that the exception is handled by a second function in the callee chain corresponding to the at least one function; and
removing the redundant exception handling code from the program.

13. A computer-implemented method, comprising:
creating a call graph for a program that has been translated from source code;
marking a function in the call graph if the function throws at least one exception;
analyzing the call graph to identify redundant exception handling code in the program by:
identifying at least one function which includes at least a portion of the redundant exception handling code by determining that a first function in at least one callsite corresponding to the at least one function throws an exception and that the exception is handled by a second function in the at least one callsite corresponding to the at least one function; and
removing the redundant exception handling code from the program.

* * * * *